United States Patent

[11] 3,572,643

| [72] | Inventor | Bert A. Birdsall |
| | | Mondamin, Iowa 51557 |
| [21] | Appl. No. | 752,843 |
| [22] | Filed | Aug. 15, 1968 |
| [45] | Patented | Mar. 30, 1971 |

[54] MATERIAL CARRIER APPARATUS
5 Claims, 15 Drawing Figs.

[52] U.S. Cl. ............................................. 259/4,
259/37, 259/99, 259/171, 214/83.32, 214/521
[51] Int. Cl. ............................................. B01f 15/02
[50] Field of Search .......................................... 259/18, 40,
95, 97, 4, 5, 6, 7, 41, 42; 214/521, 522, 83.32

[56] References Cited
UNITED STATES PATENTS

| 710,611 | 10/1902 | Ray | 214/521 |
| 2,057,403 | 10/1936 | Vali | 214/521 |
| 2,839,208 | 6/1958 | Hansen | 214/522 |
| 2,907,482 | 10/1959 | Smith | 214/83.32 |
| 2,960,320 | 11/1960 | Heider | 214/522 |
| 3,194,538 | 7/1965 | Murray | 259/97X |

*Primary Examiner*—Robert W. Jenkins
*Attorney*—Hofgren, Wegner, Allen, Stellman & McCord ABSTRACT: A material carrier movable over the ground and having structure to facilitate downward flow of material therein to a discharge opening and with structure for tilting of the carrier relative to the supporting frame and additionally with improved elevator mechanism for elevating material and for discharging it either away from the carrier or back into the container box of the carrier, with provisions for spreading the material over the area of the container. Automatic cycling feed mixer structure disposable in the container mixes material carried therein and an insertable cross conveyor conveys material outwardly from the bottom of the container. Additionally, an alternately usable auger conveyor is provided with an elevating auger and a charging auger to advance material to the elevating auger to have it carry a full load and with a common drive including a belt changing direction 90° in its travel.

INVENTOR
BERT A. BIRDSALL
By Hofgren, Wegner,
Allen, Stellman & McCord
ATTORNEYS Patented March 30, 1971

INVENTOR

BERT A. BIRDSALL

Patented March 30, 1971

INVENTOR
BERT A. BIRDSALL

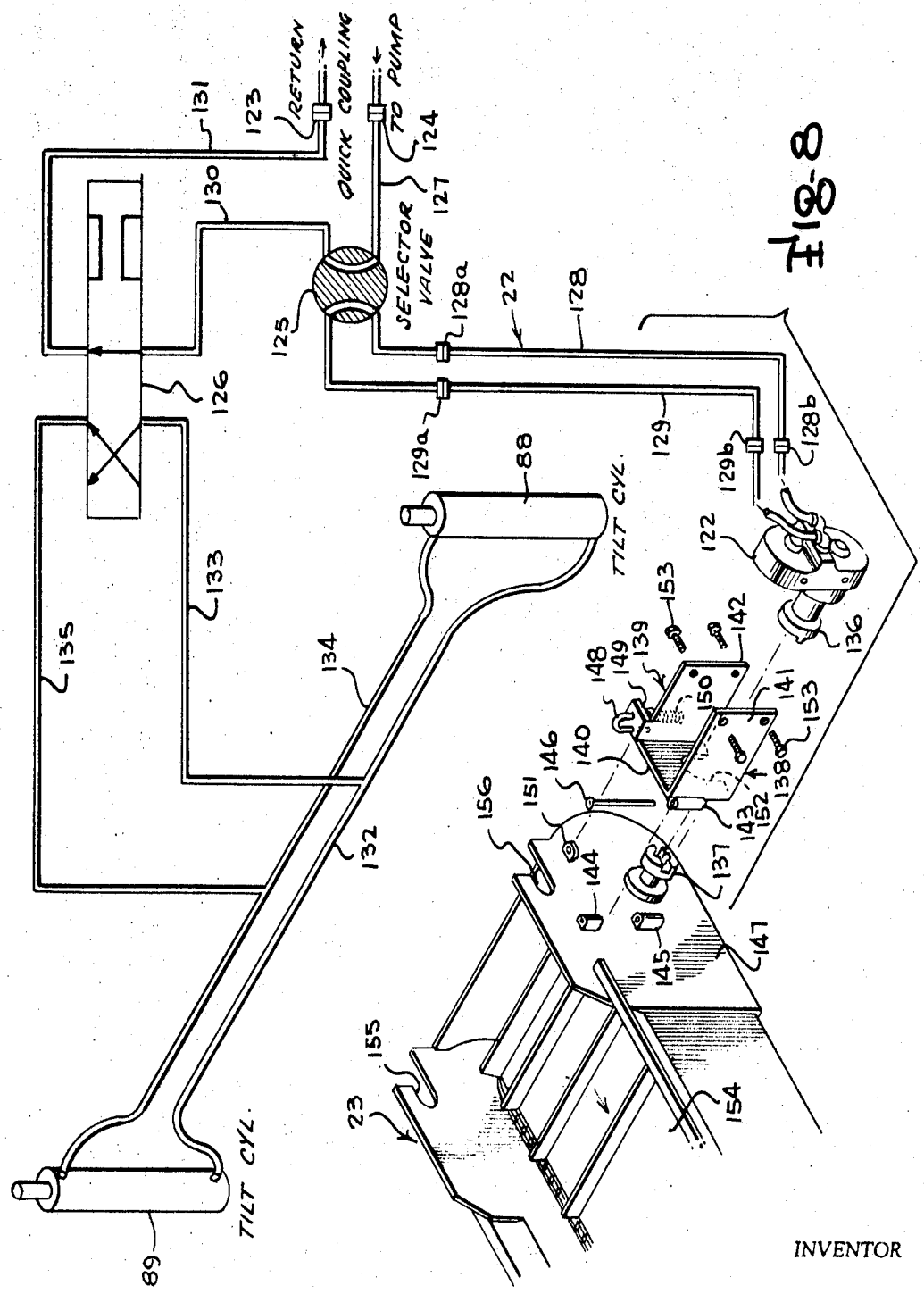

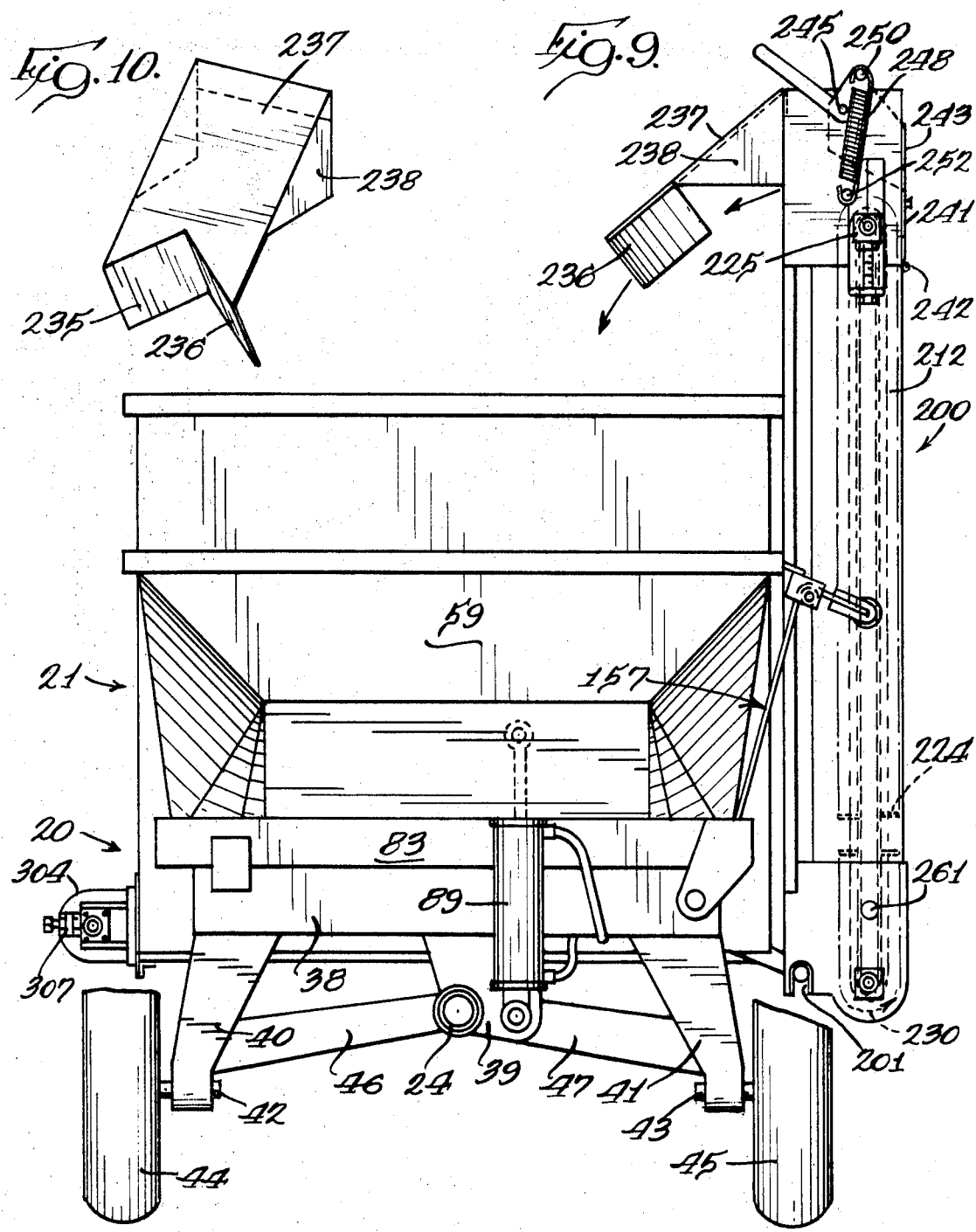

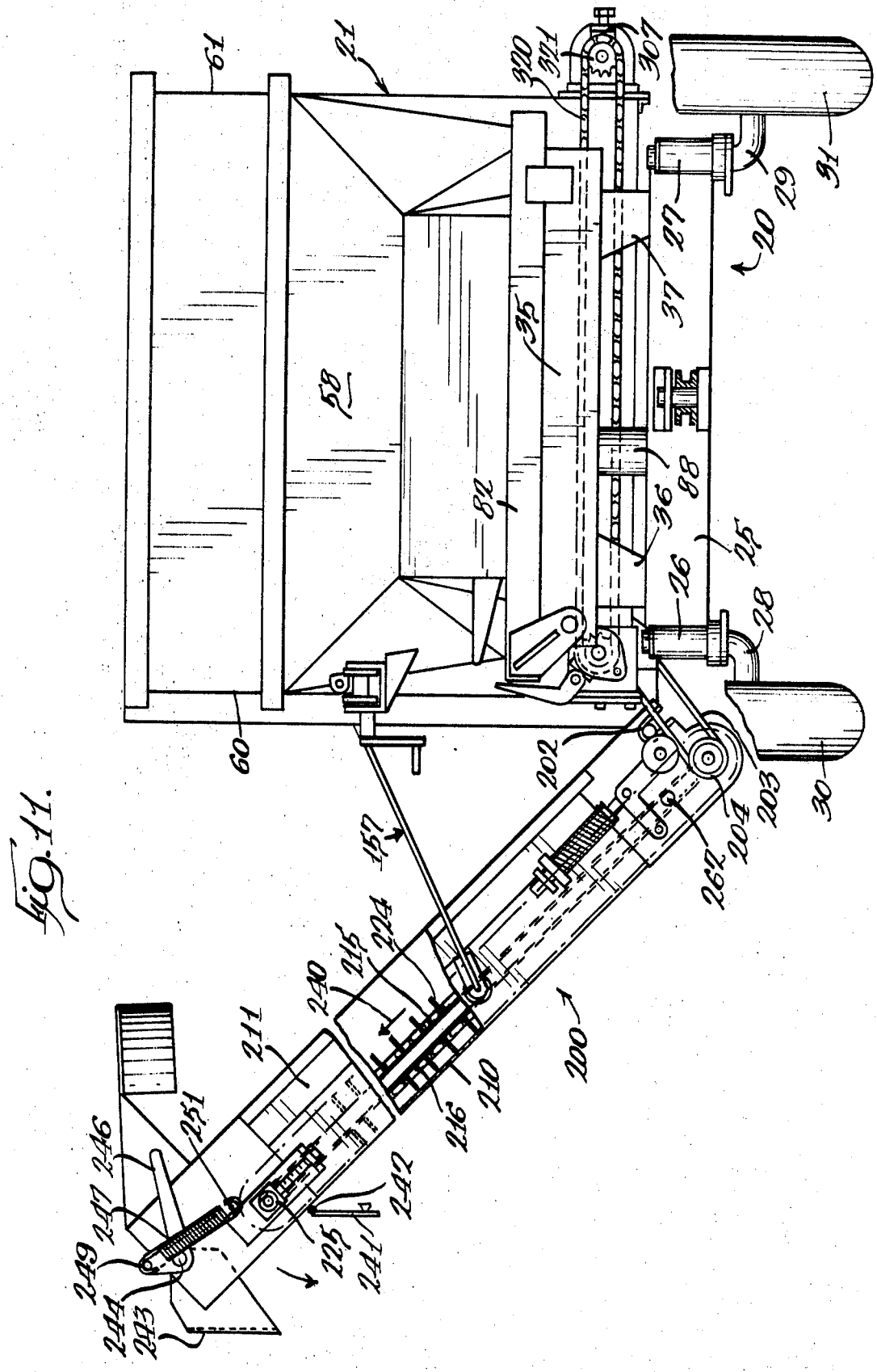

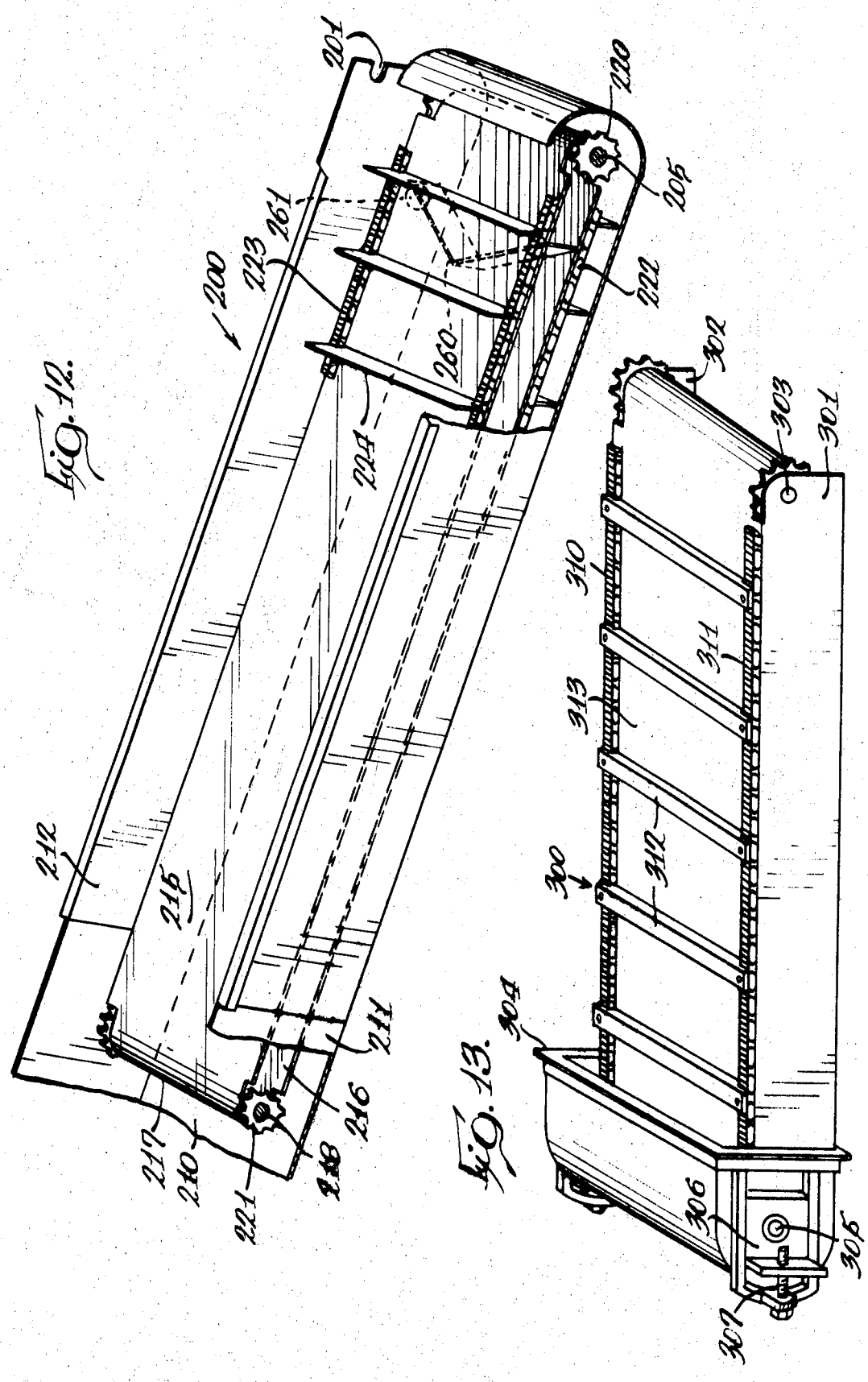

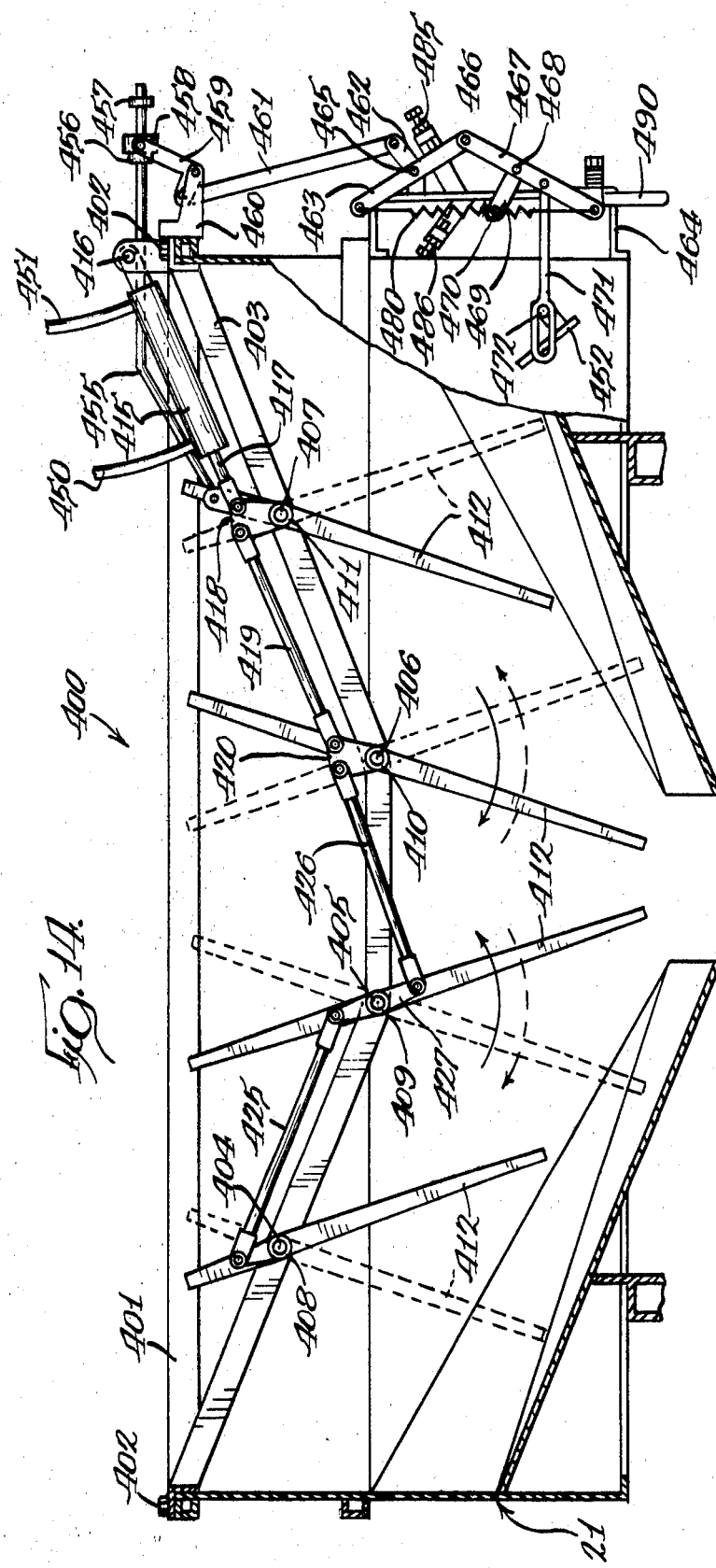

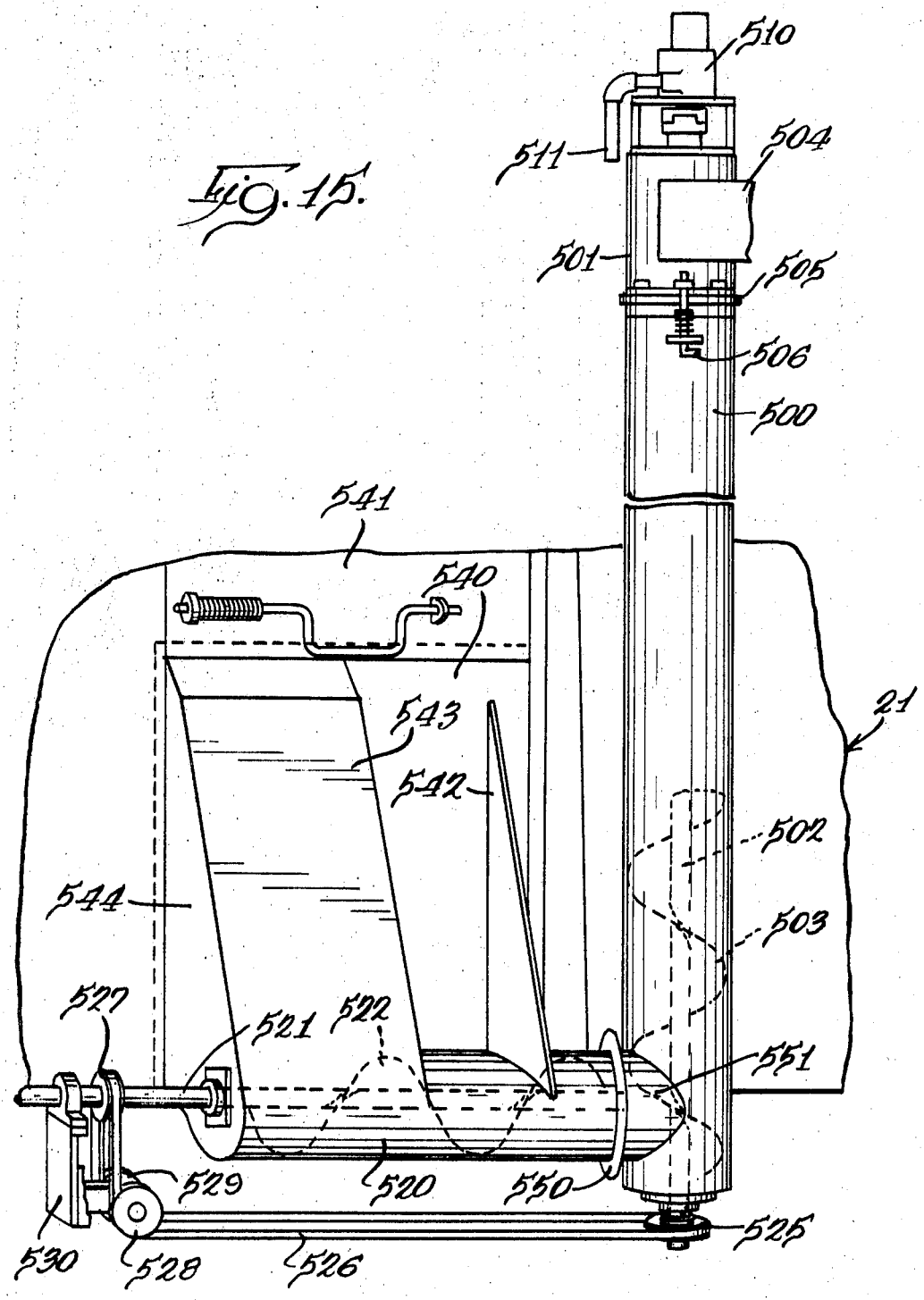

MATERIAL CARRIER APPARATUS

CROSS REFERENCE TO RELATED APPLICATION

This application includes the subject matter of my pending application, Ser. No. 527,947 filed Feb. 16, 1966, now Pat. No. 3,412,883, to nonelected subject matter in the copending application and with the addition of additional disclosure herein.

BACKGROUND OF THE INVENTION

This invention relates to a material carrier usable about a farm and with different types of farm products providing for loading and unloading of the products with a number of structures associated therewith to have the material carrier substantially universal in use.

SUMMARY

An object of this invention is to provide a new and improved material carrier having a plurality of structures associated therewith to provide generally universal use of the carrier.

Another object of the invention is to provide a material carrier having material elevating structure associated therewith to receive material discharged from the carrier and with selectively operable means to provide for discharge of this material away from the carrier or, alternately, back into the carrier, such as required with feed mixing and with feed mixer structure removably attached to the carrier and having mechanism for automatic cycling thereof to obtain the proper mixing of the material. The proper mixing is facilitated by the use of a spreader attachment at the upper end of the elevating conveyor which causes elevated material to discharge generally over the entire area of the carrier.

Still another object of the invention is to provide a material carrier as defined in the preceding paragraph wherein the elevating conveyor is constructed to provide long service life with the collection and discharge of particles of material and other contaminants away from the mechanism of the elevating conveyor drive.

Another object of the invention is to provide additionally auxiliary conveying structure including an elevating auger system with a generally vertical auger and a charging auger at right angles thereto for receiving material from the carrier and with a common drive to the two augers including a belt and means for causing said belt to take 90° change in direction and with a cross conveyor comprising a self-contained unit with pretensioned conveyor flights which can be inserted into an opening in the container of the carrier for conveying material outwardly of the container.

An additional object of the invention is to provide a feed mixer attachment for the material carrier having a series of rockable shafts with mixing teeth thereon and with the shafts in sets arranged to rotate in opposite to each other and to be automatically cycled by a control linkage which controls a valve in the hydraulic operating circuit with the opposed action reducing stresses transmitted to the carrier.

Further objects and advantages will become apparent from the following detailed description taken in connection with the accompanying drawings.

BRIEF DESCRIPTION OF THE DRAWING

FIG. 8 is a schematic diagrammatic view of the power supply system for the embodiment illustrated in FIGS. 1 through 7;

FIG. 9 is a rear view of the material carrier, similar to FIG. 7, showing modified conveyor structure associated therewith;

FIG. 10 is a perspective view of the V-shaped spreader associated with the elevating conveyor shown in FIG. 9;

FIG. 11 is a front elevational view of the material carrier, with the conveyor modifications shown in FIG. 9 and with the elevating conveyor at an outwardly-inclined position for outward discharge of material;

FIG. 12 is a fragmentary perspective view of the elevating conveyor shown in FIGS. 9 and 11 and with parts broken away;

FIG. 13 is a perspective view of the cross conveyor;

FIG. 14 is a longitudinal central section taken from front to rear of the material carrier and the feed mixer attached thereto along with the automatic cycling mechanism therefor; and FIG. 15 is an elevational perspective view of the elevating auger and charging auger mechanism associated with the discharge opening of the material carrier.

DESCRIPTION OF THE PREFERRED EMBODIMENT

Figure 1:
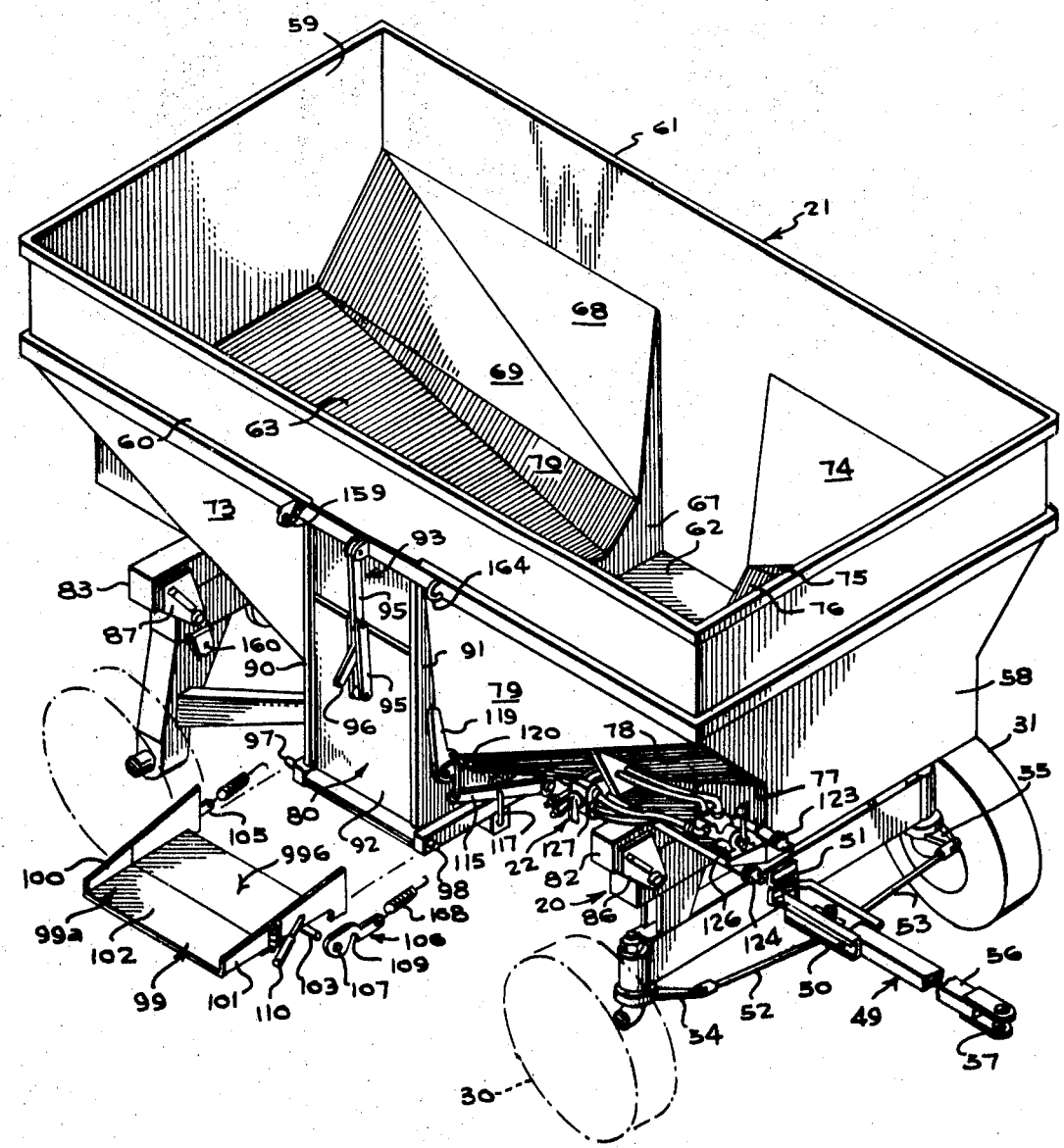
FIG. 1 is a perspective view of an embodiment of the invention.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiments illustrated. The scope of the invention will be pointed out in the appended claims.

Briefly described, the present invention relates to a material carrier apparatus adapted for use with handling apparatus for loading and unloading material from the carrier apparatus generally comprising movable support means, material container means mounted on the support means, power supply means mounted on the container means, and portable prime mover means operatively connectable to the handling apparatus for operating the same, and operatively connected to the power supply means. More specifically, in accordance with a preferred embodiment of the invention, the material carrier apparatus comprises a frame assembly mounted on wheeled units, a material container unit including front and rear walls, side walls, a bottom wall, a bottom discharge door and a side discharge door, with the bottom wall including wall sections inclined downwardly from the front and rear walls toward the discharge doors and the sidewalls including diverging wall sections extending from the front and rear walls toward the discharge doors for directing material by gravity flow toward the bottom discharge doors, a fluid supply system mounted on the container unit, a portable fluid motor operatively connectable to an attached or detached material handling apparatus for loading and unloading material from the container unit, and operatively connected to the fluid supply system, fluid actuated means for tilting the container unit and the fluid supply system including control means for selectively supplying fluid under pressure to the fluid motor and the tilting means, and additional control means for operating the tilting means.

Figure 2:
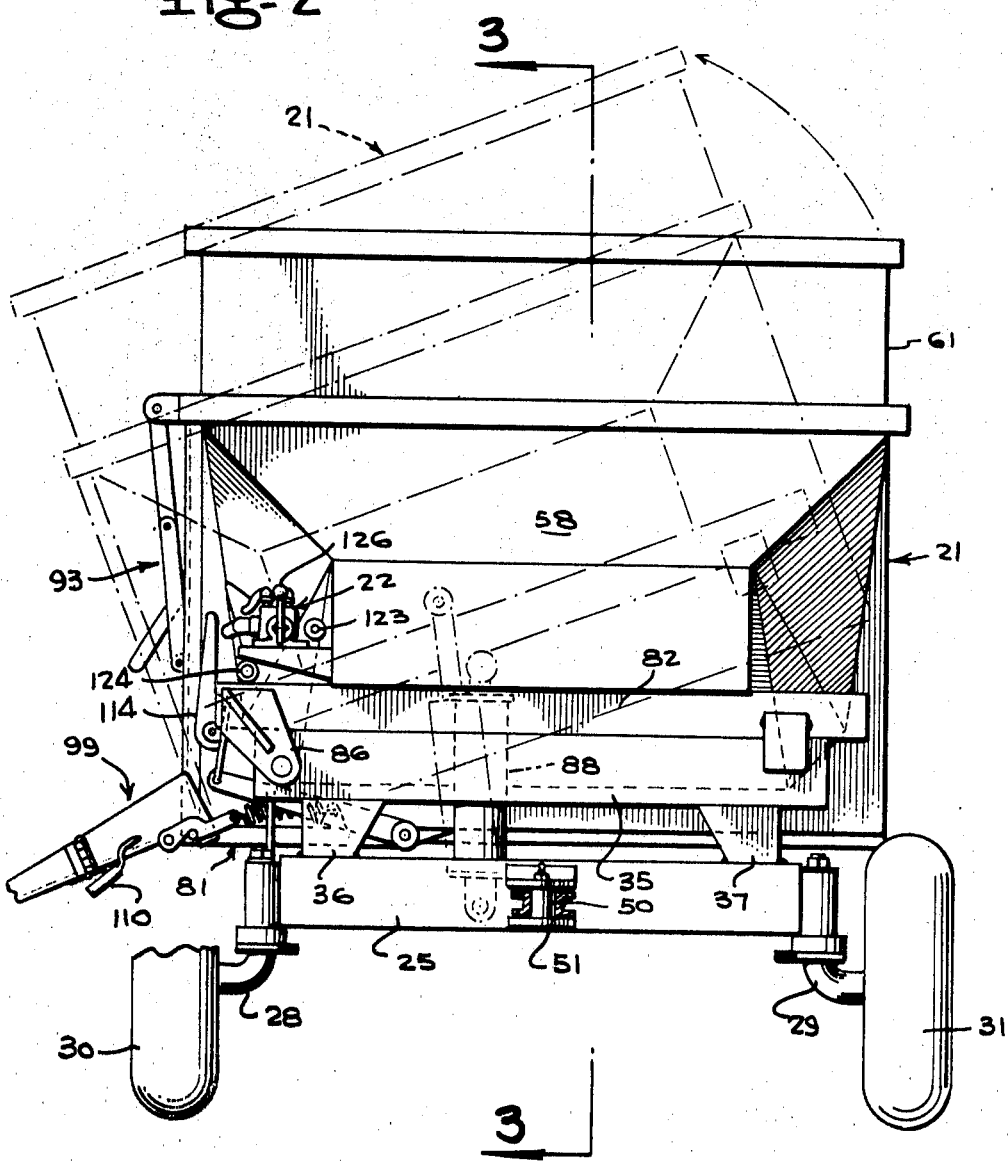
FIG. 2 is an enlarged front elevational view of the embodiment illustrated in FIG. 1, also illustrating the container unit of the embodiment in the tilted position in phantom lines.
Figure 7:
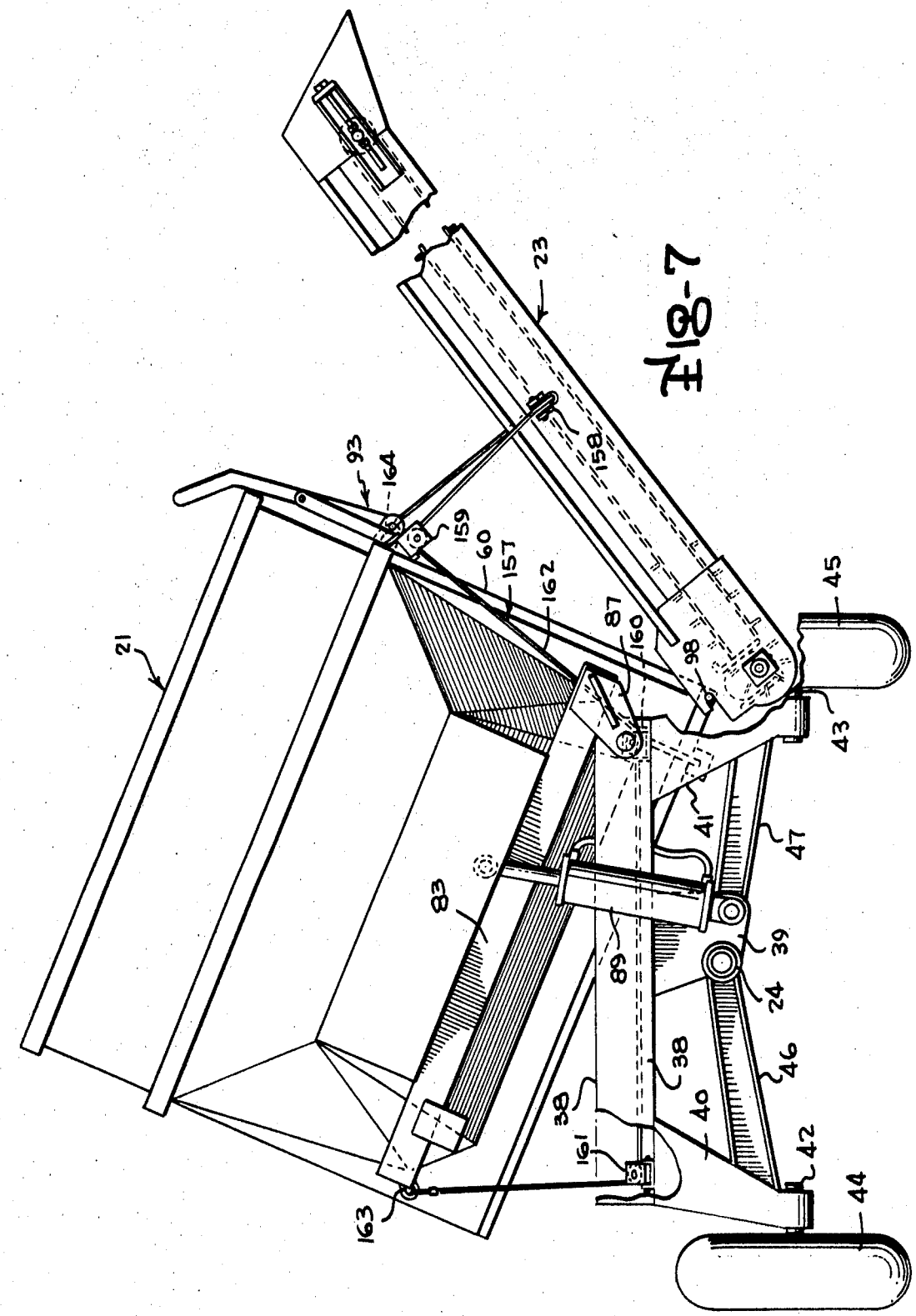
FIG. 7 is a rear view of the embodiment illustrated in FIGS. 1 through 6, showing the container unit of the embodiment in the tilted position and a material handling apparatus attached to the embodiment for receiving material being discharged from the container unit.

Referring to the drawings, there is illustrated an embodiment of the invention. This embodiment generally includes a chassis or frame assembly 20, a container unit 21 mounted on the frame assembly and pivotally connected thereto so that it may be tilted transversely in a plane substantially normal to the longitudinal centerline of the frame assembly, and a power supply system 22 which is operable to tilt the container unit and operate an attached or detached material handling apparatus, such as a flight conveyor 23, as best shown in FIG. 7. The frame assembly 20 is provided with a longitudinally disposed main cylindrical frame member 24. Mounted on the front end of the main frame member 24 is a transverse frame member 25 having bearing members 26 and 27 mounted on the lateral ends thereof. Journaled in the bearing members 26 and 27 are the upright portions of axle members 28 and 29 on which there are mounted front wheels 30 and 31. The transverse frame member 25 is rigidly secured to the main frame member 24 by means of brace members 32 and 33 interconnecting the ends of the frame member 25, and a collar member 34 rigidly secured to the main frame member. As best shown in FIG. 2, spaced above the transverse frame member 25 is a front bolster or container support member 35, which is rigidly secured to the transverse frame member 25 by means of spacer brackets 36 and 37.

Figure 6:
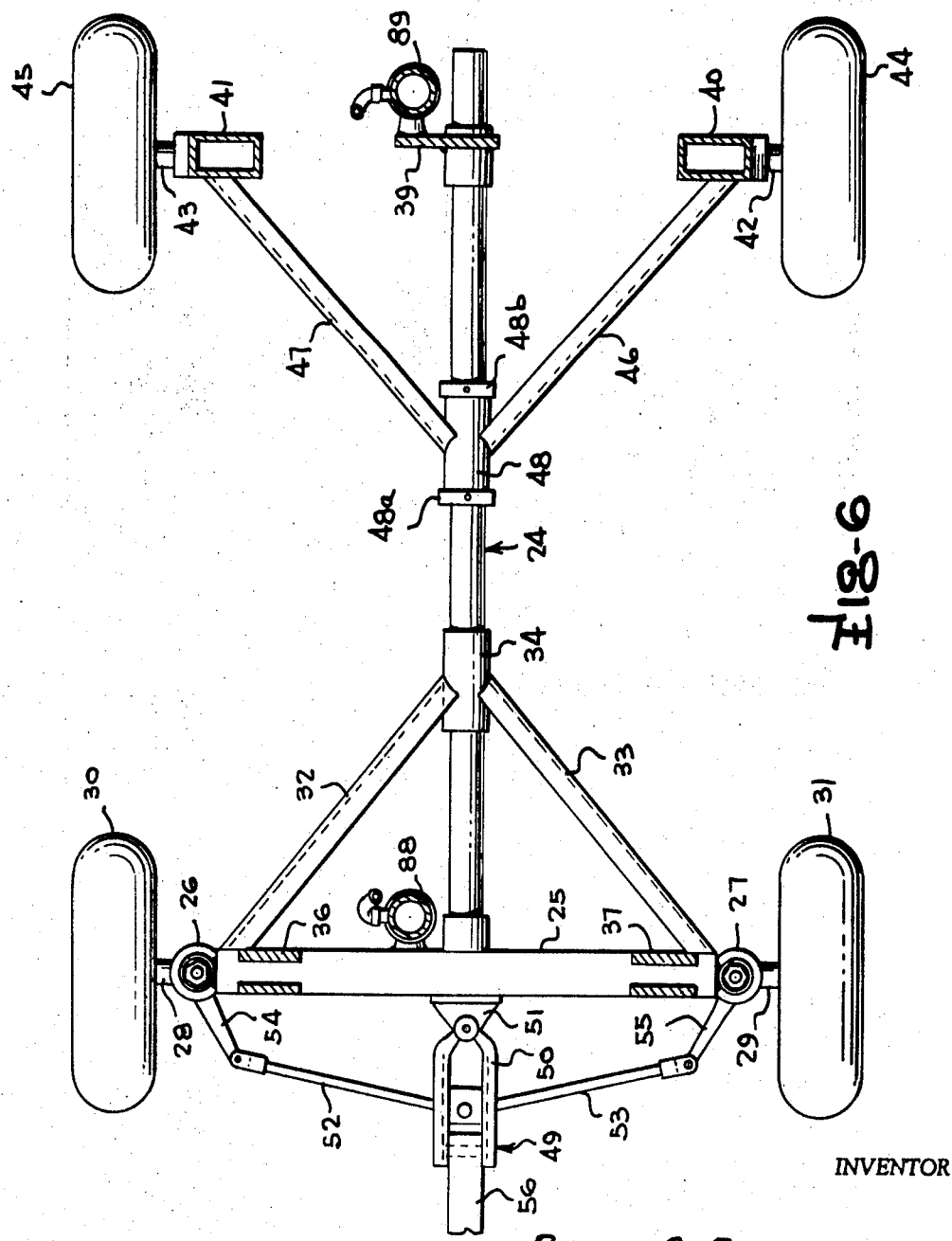
FIG. 6 is a cross-sectional view taken along line 6-6 in FIG. 3.

As best shown in FIGS. 6 and 7, the rear end of the frame assembly is provided with a rear bolster or container support member 38 which lies in substantially the same horizontal plane as the front bolster member 35. The rear bolster member 38 is supported on the rear end of the main frame member 24 by means of an interconnecting bracket member 39. Depending downwardly from the lateral ends of the rear bolster member 38 are leg members 40 and 41, having axle members 42 and 43 journaled in the lower ends thereof. The axes of the axle members 42 and 43 lie in substantially the same horizontal plane as the axle portions of axle members 28 and 29. The rear wheels 44 and 45 are mounted on the axles 42 and 43. The depending leg members 40 and 41 further are mounted on the main frame member 24 by means of brace members 46 and 47 interconnecting the depending leg members, and a collar member 48 mounted on the main frame member 24. Collar member 48 is free to rotate on frame member 24 about the longitudinal axis thereof and is prevented from axial movement by means of rigidly mounted collar members 48a and 48b. This permits wheels 44 and 45 to easily negotiate uneven ground.

The carrier apparatus is adapted to be drawn by a tractor or other prime mover means by means of the draw bar assembly 49. The assembly 49 includes a linkage member 50, which is pivotally connected to a bracket member 51 mounted on the front end of the transverse frame member 25, and which is pivotal in a horizontal plane. Pivotally connected to the linking member 50 are tie bars 52 and 53 which are connected at their outer ends to turning arms 54 and 55. The turning arms are rigidly secured to the upright portions of axle members 28 and 29. The draw bar assembly also includes a linking member 56 which is pivotally connected to the front end of linking member 50 for movement in substantially vertical plane, and which is provided with a front end hitch 57 for connecting the carrier apparatus to the prime mover means.

The container unit 21 includes a front end wall 58, a rear end wall 59, sidewalls 60 and 61 and a bottom wall 62. The bottom wall includes bottom sections 63 and 64 which are inclined downwardly from the end walls 58 and 59 and terminate above horizontal bottom wall section 65 to provide opposing, transverse vertical wall sections 66 and 67. The inclined bottom wall sections 63 and 64 have gradually increasing width as they extend from end walls 58 and 59 toward the bottom wall section 65. The lengths of the lower inner edges of sections 63 and 64 are greater than the length of the upper outer edges thereof. The rear end of the sidewalls 60 and 61 of the container unit are provided with sidewall sections 68 through 73, which extend from the rear end wall 59 to the transverse vertical wall 67. The sidewall sections 68 and 73 are inclined inwardly and downwardly, having side edges diverging from the rear corners of the container unit, and terminating at the transverse vertical wall 67. The sidewall sections 70 and 71 are inclined inwardly and downwardly, having side edges diverging from the rear end wall 59 and terminating at the transverse vertical wall 67. The intermediate sidewall sections 69 and 72 also are inclined inwardly and downwardly, adjoining sidewall sections 68 and 70, and 73 and 71, respectively, so that any corners in the rear end of the container unit are eliminated.

The front end of the container includes sidewall sections 74 through 79, which are substantially similar to sidewall sections 68 through 73. The sidewall sections 74 through 79 also eliminate any corners in the front end of the container unit. The configuration of the bottom wall sections 63 and 64 and the sidewall sections 68 through 73, and 74 through 79 permit material disposed within the container unit to move by gravity flow toward the bottom wall section 65. In addition, the configuration of the sidewall sections prevents material from becoming lodged in the corners of the container. The sidewall 60 of the container unit is provided with a side discharge door assembly 80, and the bottom wall section 62 is provided with a bottom discharge door assembly 81, as will later be described.

The container unit 21 is supported on the bolster members 35 and 38 by means of transversely extending bolster members 82 and 83, which are secured to the inclined bottom wall sections 64 and 63 by means of vertical bracket members 84 and 85, respectively. The bolster members 82 and 83 are pivotally connected to the adjacent linking members 35 and 38 by means of sets of linking arms 86 and 87, respectively, to permit the container unit 21 to be tilted in a transverse plane disposed substantially normal to the longitudinal centerline of the frame assembly. This permits material carried by the container unit 21 to flow toward the discharge door assemblies 80 and 81. The container unit 21 is tilted on the frame assembly by means of a front hydraulic cylinder 88 and a rear cylinder 89. The front cylinder is positioned adjacent the longitudinal centerline of the apparatus and is pivotally connected at its lower end to the transverse frame member 25 and at its upper end to the bracket member 84. The hydraulic cylinder member 89 similarly is mounted adjacent the longitudinal centerline of the apparatus, having its lower end pivotally connected to the bracket member 39 and its upper end pivotally connected to the bracket member 85. The hydraulic cylinder units 88 and 89 are operated by the power supply system 22, which will later be described.

Figure 3:
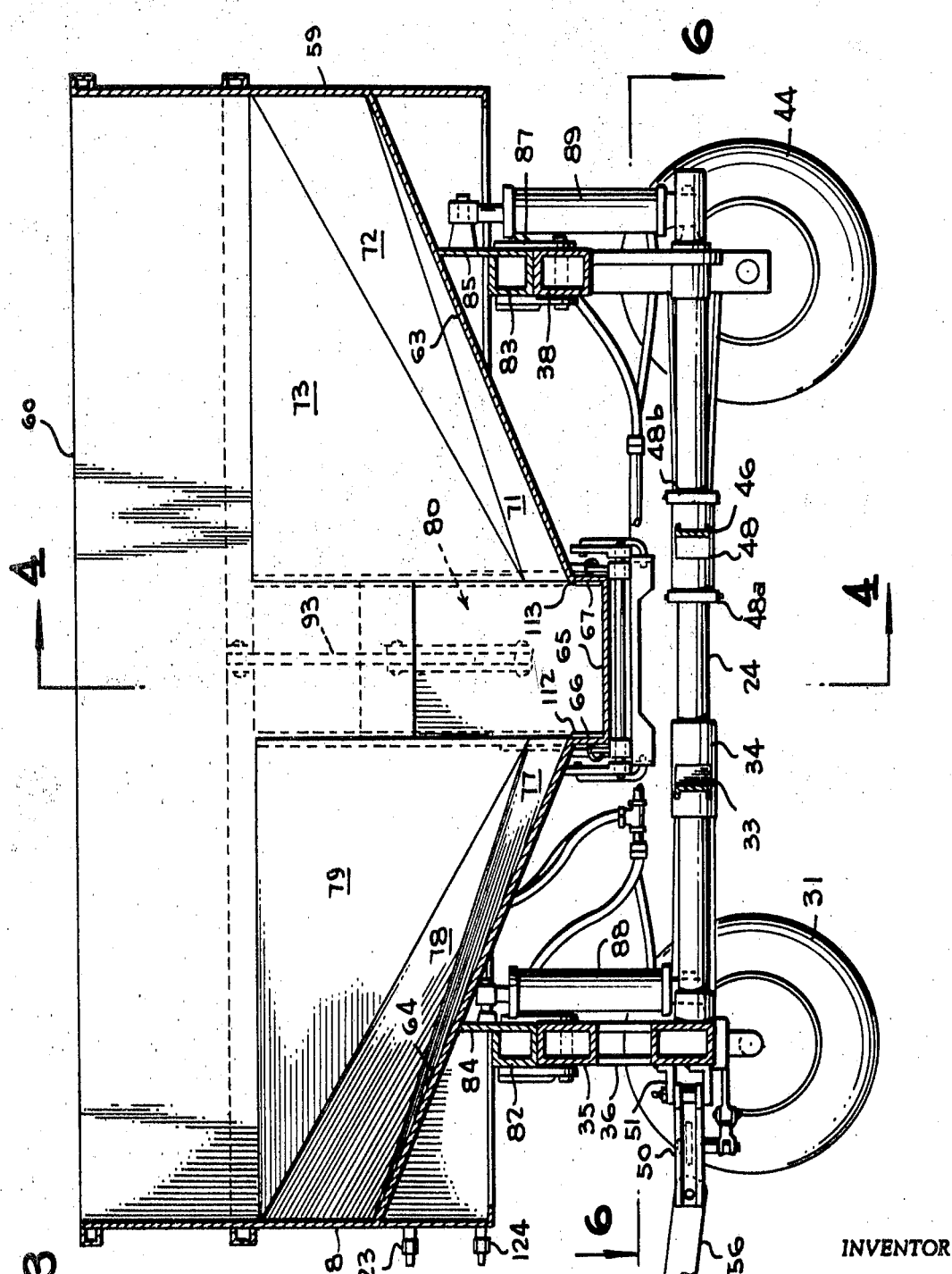
FIG. 3 is a cross-sectional view taken along line 3-3 in FIG. 2.
Figure 4:
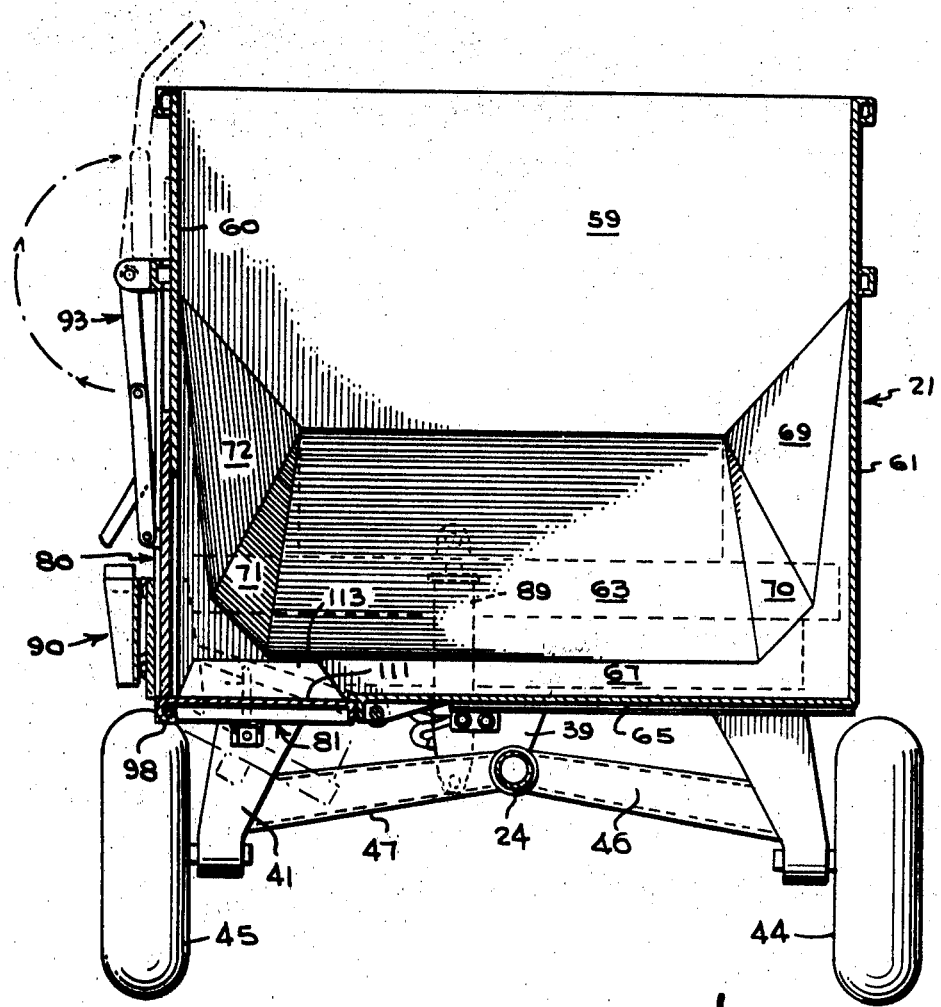
FIG. 4 is a cross-sectional view taken along line 4-4 in FIG. 3.
Figure 5:
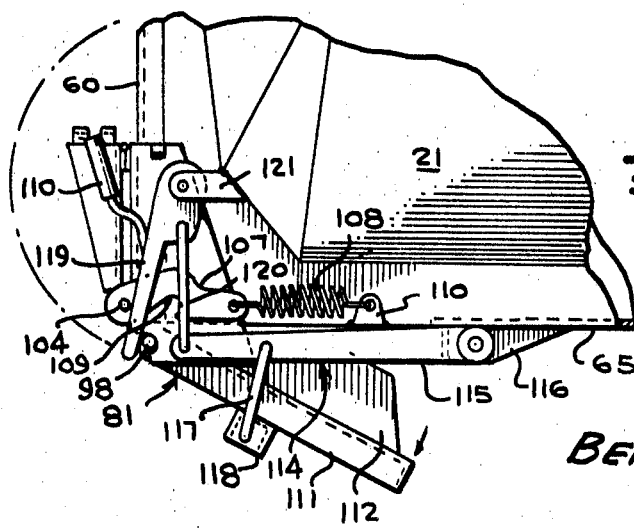
FIG. 5 is an enlarged fragmentary view illustrating portions of the side and bottom discharge door assemblies of the container unit of the embodiment.

As best illustrated in FIGS. 1, 3 and 4, the side discharge door assembly includes a pair of spaced vertical tracks 90 and 91, which vertically guide a door member 92. The door 92 is opened and closed by a hand operated mechanism 93, which includes a lower link member 94, having the lower end thereof pivotally connected to the door member 92 and the upper end thereof pivotally connected to the lower end of an upper link member 95. The upper link member 95 is pivotally connected to the sidewall 60 above the door member 92. The upper link member 95 also includes a downwardly and outwardly projecting handle member 96, which is adapted to be lifted upwardly, rotating the upper link member 95 about its pivotal connection with the sidewall 60, to lift and lower the discharge door member 92. The bottom wall section 62 of the container unit also is provided with a longitudinally disposed hinge pin 98, disposed adjacent the bottom of the side discharge door assembly 80. Mounted on the hinge pin 98 is a chute member 99, having a pair of spaced sidewalls 100 and 101 and a bottom wall 102. The chute member comprises hinged front and rear sections 99a and 99b, which permit the front section 99a to be swung downwardly and against the underside of the rear section 99b, as illustrated in FIG. 5. Suitable means are provided for retaining the sections in the position as illustrated in FIGS. 1 and 2.

The sidewalls 100 and 101 each are provided with a recess, as at 103, disposed toward the rear ends thereof, to permit the chute member 99 to be hooked on the ends of hinge pin 98. Disposed forwardly of the recesses 103 of the sidewalls 100 and 101 is a rod member 104, having the ends thereof extending beyond the sidewalls 100 and 101. The chute member 99 can be maintained in the operative position, as illustrated in FIG. 2, for receiving material from the interior of the container unit through the side discharge door, or in the inoperative position, as illustrated in FIG. 5, by means of similar retainer mechanisms 105 and 106. The retainer mechanism 106 includes a catch member 107 and a coil spring member 108. The catch member 107 is pivotally mounted on the rod member 104, and is provided with a recess 109 adapted to be caught on the pin 98 when the chute member 99 is in the operative position, as illustrated in FIG. 2. The coil spring member 108 is connected at one end, to the free end of the catch member 107 and is anchored at the other end to a lug 110, mounted on the container unit. When it is desired to move the chute member into the inoperative position, as illustrated in FIG. 5, the chute member is moved upwardly so that the catch members 107 are freed from the pin 98. After the catch members 107 are clear of the pin 98, the chute member is permitted to be swung upwardly and against the side discharge door 92 under the influence of the coil spring member 108. The front section 92a of the chute member also is swung downwardly against the underside of the rear section 99 in the position, as illustrated in FIG. 5 The chute member 99 can be moved between the operative and inoperative positions by means of a handle member 110. It also will be noted that the sidewalls 100 and 101 of the chute member are spaced slightly further apart than the transverse vertical walls 66 and 67 of the container unit, to permit the bottom wall 102 of the chute member to be positioned adjacent the side discharge door 92 when moved into the inoperative position. In such position, the sidewalls 100 and 101 will be disposed adjacent the transverse vertical wall sections 66 and 67.

The bottom discharge door assembly 81 includes a door 111 having upwardly extending sidewalls 112 and 113, which is hingedly connected at its outer ends to hinge pin 98. As best shown in FIG. 3, the sidewalls 112 and 113 are adapted to extend into the interior of the container unit through a discharge opening in the bottom wall section 65. Also, it will be noted that the spacing between the sidewalls 112 and 113 is slightly less than the spacing between transverse vertical wall sections 66 and 67, so that the sidewalls 112 and 113 are disposed adjacent the wall sections 66 and 67 when the door is in the closed position. The bottom discharge door 111 is opened and closed by means of a manually operated mechanism 114. This mechanism includes a lever arm 115 which is pivotally connected at its inner end to a bracket 116 rigidly secured to the underside of bottom wall section 65. The door 111 is carried by the lever arm 115 by means of a link member 117, connected thereto intermediate its ends, and secured at its lower end to a crossmember 118 rigidly secured to the underside of the door 111. The free end of the lever arm 115 is connected to a handle member 119 by means of a link member 120. The handle member 119 is pivotally connected to a bracket 121 rigidly secured to the container unit, to permit the handle member 119 to be pivoted in a substantially vertical plane. It will be appreciated that by lifting and lowering the handle member 119 to pivot the same about its pivotal connection with the bracket member 121, the door member 111 may be opened and closed.

The embodiment includes a portable fluid motor 122, which is operatively connected to the power supply system 22 and is connectable to either attached or detached apparatus from loading and unloading material from the container unit, such as the flight conveyor 23. The power supply system 22 is of the fluid type, as is utilized to operate both the tilting cylinders 88 and 89 and the fluid motor 122. As best seen in FIG. 8, the system 22 includes a pair of connectors 123 and 124 which are adapted to be connected to a source of fluid under pressure, preferably on the prime mover means such as a tractor, a selector valve 125 which controls the supply of fluid to the tilting cylinders 88 and 89, and the fluid motor 122, and a control valve 126 which controls the flow of fluid to the tilting cylinders. The fluid circuit includes a line 127 which interconnects the connector 124 and the selector valve 125, supply and return lines 128 and 129 which interconnect the selector valve 125 and the fluid motor 122, and supply and return lines 130 and 131 which interconnect the selector valve 125 and the connector 123 with the control valve 126. Supply and return lines 128 and 129 are provided with a first set of connectors 128a and 129a located adjacent the selector valve 125, and a second set of connectors 128b and 129b located adjacent the fluid motor 122. The lower end of the cylinders intercommunicate by means of a line 132 which is connected to the control valve 126 by means of a line 133. Similarly, the upper ends of the cylinders intercommunicate by means of a line 134 which is connected to the control valve 126 by means of a line 135.

Either the set of tilting cylinders 88 and 89 or the fluid motor 122 can be operated by manipulating the selector valve 125. Also, the flow of fluid to the tilting cylinders 88 and 89 can be controlled by the control valve 126. With the valves 125 and 126 in the positions as illustrated in FIG. 8, no fluid is supplied either to the tilting cylinders or the fluid motor. The fluid simply circulates through line 127, selector valve 125, supply line 130, control valve 126 and return line 131. When it is desired to operate the fluid motor, the control handle on the selector valve 125 is turned 90°, so that fluid flows through line 127, selector valve 125, supply line 128, through the fluid motor, and is returned through return line 129, selector valve 125, line 130, control valve 126 and return line 131. In the event it is desired to operate only the tilting cylinders, the selector valve is turned to the position as illustrated in FIG. 8, and the control valve 126 is moved either to the left or the right, depending on whether it is desired to lift or lower the container unit. When the control valve 126 is moved to the left, fluid from the selector valve 125 will flow through line 130, control valve 126 and lines 133 and 132, to the lower ends of the tilting cylinders. Simultaneously, fluid will be forced from the upper ends of the cylinders through lines 134 and 135, the control valve 126 and return line 131. Under such conditions, the container unit will be tilted upwardly. By moving the control valve 126 to the right, the flow of fluid in the lines described substantially will be reversed to cause the container unit to tilt downwardly.

The output drive shaft 136 of the portable fluid motor is adapted to be operatively connected to the input drive shaft 137 of the conveyor unit 23 when the fluid motor is mounted on the mounting assembly 138 of the conveyor unit. The mounting assembly 138 comprises a bracket member 139, having a rear wall 140 and spaced sidewalls 141 and 142. The bracket member 139 is provided with a hinge section 143 which is adapted to be inserted between vertically spaced hinge sections 144 and 145 on the conveyor unit, and hingedly connected to the conveyor unit by means of a hinge pin 146, which is inserted through registered openings in the hinge sections 143, 144 and 145. When the bracket 139 is hingedly connected to the conveyor unit, the rear wall 140 can be swung against the sidewall 147 of the container unit and retained in such position by means of a lock pin 148 mounted in a flange 149 on the sidewall 142, which is biased downwardly by means of a spring 150, so that it will be received within a registered opening provided in a lug 151 mounted on the sidewall 147 of the conveyor unit. The bottom edge or rear wall 140 of the bracket member is provided with a recess 152 for receiving the input shaft 137 of the conveyor unit therethrough when the mounting assembly 138 is mounted on the conveyor unit. When the output shaft 136 is operatively connected to the input shaft 137 for transmitting drive therethrough, the fluid motor 122 is positioned between the side walls 141 and 142 of the mounting assembly and is secured in such position by means of a plurality of bolts 153.

The flight conveyor unit 23 is of conventional construction, which includes a flight conveyor 154 adapted to be driven by the input shaft 137. The upper rear ends of the sidewalls of the conveyor unit are provided with rearwardly opening recesses 155 and 156, so that the conveyor units can be hingedly attached to the ends of the hinge pin 98, mounted on the container unit 21. In such position, the lower end of the conveyor unit 23 is adapted to receive material from the container unit through side discharge opening when the side discharge door 92 has been opened.

Although the portable fluid motor 122 has been described in connection with the use of a flight conveyor attached to the carrier apparatus for receiving material discharged through the side opening in the container unit, it will be understood that the portable fluid motor is intended to be used with various types of handling apparatus for loading and unloading material from the container unit. For example, the fluid motor can be used with a detached flight conveyor, which is employed for receiving material discharged through the side door onto the chute member 99 or through the bottom discharge door. In addition, the fluid motor can be used to operate a detached flight conveyor for loading material into the container unit through the open upper end thereof.

Another feature of the invention relates to the means of supporting the attached conveyor unit 23 and maintaining the same in a fixed position while tilting the container unit 21 to discharge the material through the side door onto the lower end of the conveyor unit. This means includes a cable assembly 157, as best illustrated in FIG. 7, which includes a sheave 158 mounted on the conveyor unit 23, a sheave 159 mounted on the sidewall 60 of the container unit, sheaves 160 and 161 mounted on the bolster member 38 and a cable 162. The cable 162 is secured at one end to a hook 163 mounted on the end of the bolster member 83 opposite from the end adjacent the conveyor unit, reeved under and around sheaves 160 and 161, over and around sheave 159, under and around sheave 158, and is secured at its opposite end to a hook member 164 mounted on the upper end of wall member 60. With this type of cable arrangement, the container unit 21 may be lifted and lowered without disturbing the position of the conveyor unit 23.

A modification of the elevator conveyor 23 is shown in FIGS. 9 to 12 and is identified at 200. This unit can be mounted onto the carrier in a manner similar to the elevator 23 by means of slots 201 and 202 at the lower end fitted on pins on the carrier and with the drive being derived from a reversible prime mover through a drive belt 203 (FIG. 11) which drives a pulley 204 on a lower sprocket shaft 205 for the elevator conveyor. The elevator conveyor has a U-shaped trough defined by a baseplate 210 and a pair of sidewalls 211 and 212 and with the lower sprocket shaft 205 rotatably mounted on the sidewalls by suitable bearings. A divider means spans the trough and extends longitudinally thereof and comprises a pair of plates 215 and 216 which are spaced apart from each other and which, at their edges, are attached to the sidewalls 211 and 212 of the elevator conveyor. The sprocket shaft 205 extends between these plates. The plates have curved connecting ends to enclose the space at the ends thereof. The curved end 217 closes the upper end of the space between the divider plates. A second sprocket shaft 218 and the sprocket shaft 205 each have a pair of sprockets 220 and 221 along which a pair of chains 222 and 223 travel with a series of conveyor flights 224 attached to the chains.

The upper sprocket shaft 218 passes within the curved end 217 and has bearings extending outwardly of the sidewalls 211 and 212 as indicated at 225 which are adjustable to provide suitable tension on the conveyor chains 222 and 223.

The elevating conveyor flights can travel in either direction by reversal of the drive for the power belt 203. With the conveyor flights 224 travelling in the direction as indicated by the arrow 230 in FIG. 9 and with the conveyor in an upright position, material discharged from the container travels upwardly between the divider plate 216 and the elevator conveyor base 210, and, in passing around the upper curved end 217 of the divider, is directed to the left, as viewed in FIG. 9 to flow into the container. In order to obtain wide dispersion of the material directed back into the container, a V-shaped spreader having angularly related panels 235 and 236 is attached to the upper end of the elevator conveyor by a plate 237 with a pair of side plates, one of which is indicated at 238. This separator divides the material elevated by the conveyor and directs it toward each end of the container 21 and, as subsequently described, a feed mixer associated with the container can provide for thorough mixing of this material in the container.

With the elevating conveyor 200 in an outwardly inclined position, as shown in FIG. 11, the conveyor flights 224 are reversed to have the material travel upwardly in the path indicated by the arrow 240 in FIG. 11 and the material then passes over the curved end 217 and outwardly through the base 210 of the elevator conveyor as provided by selectively operable door means. These doors are closed when the conveyor is utilized in the manner shown in FIG. 9. This door structure includes a lower door 241 pivoted to the base 210 at 242 and an upper door 243 pivoted to the conveyor sidewalls 211 and 212, as indicated at 244 and 245. The door 243, when closed as shown in FIG. 9, is of a sufficient height to overlap the closed door 241 and hold the lower door closed. The upper door 243 is held in either an open or closed position by means of a handle and overcenter spring structure. A handle 246 provides for operation of the door 243 in pivoting about the pivots 244 and 245, with the overcenter springs 247 and 248 connected between pins 249 and 250 on a handle extension and pins 251 and 252 on the conveyor sidewalls, with the spring moving to either side of the pivot pins 244 and 245 when the door 243 moves between open and closed positions.

With the elevating conveyor as shown in FIG. 11, material discharged from the container can be carried upwardly in the direction of the arrow 240 and discharged for loading feed bunks while the carrier is travelling or for loading self-feeders while the carrier is stationary.

The construction of the elevating conveyor provides for improved operation in having one upward conveyor channel defined by the divider plate 216 and the base 210 of the elevating conveyor trough, while the flow of material in the opposite direction is between the divider plate 215 and the side wall of the container which, as shown in FIG. 9, forms a closure for confining the material that is elevated.

In order to have the lower sprocket shaft 205 and its bearings operate free of dust of small particles of conveyed material, a V-shaped baffle 260 is positioned between the divider plates 215 and 216, as shown in FIG. 12, and extends to the sidewalls 211 and 212 of the trough to catch any material falling downwardly between the plates and prevent it travelling to the lower sprocket shaft 205. This material is caused to move outwardly through openings 261 and 262 in the trough sidewalls 212 and 211, respectively, and as shown in FIGS. 9 and 11.

To facilitate use of the elevator conveyor 200, a cross feed conveyor, indicated generally at 300, as shown in FIG. 13, is provided. This cross conveyor has a pair of side plates 301 and 302, with the sprocket shaft 303 extending between these plates and mounted therein at one end and with a hood 304 fixed to the plates at the opposite end. This unit can be inserted in an opening in the container 21 with the perimeter of the hood 304 closing the opening. A second sprocket shaft 305 is mounted in adjustable blocks 306, one of which is shown in FIG. 13, with these blocks each being adjusted by threaded members connected between a flange on the block and an end of the hood frame and, as indicated at 307. By this adjustment, the distance between the sprocket shafts 303 and 305 can be adjusted to control the tension on a pair of chains 310 and 311. These chains have a series of conveyor flights 312 extending therebetween and with a support plate 313 between the side plates 301 and 302 providing for support of material conveyed by the flights. This unit, as seen in FIGS. 9 and 11, can be inserted into the opening in the container sidewall and feeds material toward the elevating conveyor 200. The cross feed conveyor can be driven from a power takeoff by a chain 320, shown in FIG. 11, passing about a sprocket 321 on the sprocket shaft 305. This unit can be quickly installed and removed by one man merely by removing the chain 320 from the sprocket 321 and facilitates handling of hard-to-move material, such as ensilage and materials of high moisture content. Reversal of drive of the chain 320 can result in conveying of material in the opposite direction with a suitable opening provided in the hood 304.

The feed mixer is shown in FIG. 14 in central section and indicated generally at 400 with mounting thereof in the container 21. A supporting frame 401 overlies and fits around the upper end of the container and can be bolted thereto, as indicated by bolts 402. The feed mixer has identical operating mechanism at each side with that on one side shown in FIG. 14. This frame has a pair of downwardly-sloped side supports, one of which is shown at 403, extending along the interior sides of the container 21 and having a series of spindles 404, 405, 406 and 407 extending therebetween. Each of these spindles mounts a hollow rotatable shaft 408, 409, 410, and 411, with a plurality of mixing teeth 412 extending downwardly from each of the rockable shafts. Mechanism is associated with each of the side frames 403 for causing cyclical oscillatory movement of the mixing teeth, including an hydraulic cylinder 415 connected to the frame 401 by a pin 416 and having a piston rod 417 connected to an arm 418 affixed to the rockable shaft 411. A pivoted link 419 connects the arm 418 to an arm 420 connected to the rockable shaft 410. Thus, the teeth 412 on the shafts 410 and 411 are caused to oscillate simultaneously in the same direction. The rockable shafts 408 and 409 are pivotally connected by a link 425 for simultaneous oscillation in the same direction, with this movement being derived from the arm 420 through a connecting link 426 pivoted between the arm 420 and an arm 427 extending downwardly from the rock shaft 409. With this arrangement, the teeth on the shafts 410 and 411 oscillate in an opposite direction to the teeth on the shafts 408 and 409, to minimize the forces applied to the mixer frame 401 and the container 21. As seen in FIG. 14, the lower end of the teeth extend near the bottom of the container to obtain thorough mixing of material.

The feed mixing teeth can automatically be cycled by providing a control for flow of fluid to opposite ends of the cylinders 415 through lines 450 and 451, with the circuit including a control valve at one side of the container having an operating arm 452, shown in FIG. 14. The circuit connecting the valve and cylinder can be conventional, with positioning of the valve at opposite extremes reversing the flow of fluid to the cylinders. The reversal of the valve by operation of the arm 452 is accomplished through a control linkage actuated by a link 455 extending from the rock shaft 411 on the spindle 407 having a pair of adjustable collars 456 and 457 thereon which, in their reciprocatory movement, engage an abutment 458 on a bellcrank 459 pivoted to an arm 460 on the mixer frame. The bellcrank at its opposite end has a downwardly-extending link 461 pivoted thereto which pivotally connects at its lower end to an arm 462 extending outwardly from a lever 463 pivoted, intermediate its ends, to a support 464 by a pin 465. The lever 463, at its lower end, is pivoted by a pin 466 to a lever 467 which intermediate its ends is pivotally connected by a pin 468 to an arm 469 pivoted to the support 464 by a pin 470. A slotted link 471 is connected to the lever 467 with the slot therein capturing a pin 472 on the control arm 452 for the control valve. The control linkage is shown in one limit position in FIG. 14 and with the link 455 moved to the left, bellcrank 459 is pivoted counterclockwise to lower the link 461 and pivot the lever 463 about its pivot pin 465 which swings the lever 467 in counterclockwise direction and moves it bodily to carry the interconnecting pivot pin 466 toward the left as viewed in FIG. 14 until the levers 463 and 467 have moved past a straight-line position. A snap action in moving past straight-line is obtained by the spring 480 which extends between an upper end of the lever 463 and a lower end of a lever 467. In order to limit the extent of movement of the control linkage and prevent damage to the control valve, a pair of threaded adjustable stops 485 and 486 engage the lever 463 in its opposite limit position.

A handle 490 can be operated to place the control linkage in a position to neutralize the controls and prevent oscillation of the feed mixing teeth.

The auger conveyor is shown in FIG. 15, with the elevating auger comprising two tubular end-to-end sections 500 and 501 having an auger shaft 502 extending lengthwise thereof with an auger 503 extending from the lower end of the tubular members to an upper point coincident with a discharge trough 504, shown broken away. The material can be discharged in any direction, including back into the container by suitable rotation of the tubular section 501 relative to the section 500 as permitted by the rotatable connection 505 and which is held in a selected position by a spring latch 506. The auger shaft 502 is driven by a fluid motor 510 connected to the upper end thereof and supplied with fluid from a source through lines, one of which is shown at 511.

In order to have the auger 503 carry a full load upwardly, a charging auger is provided having a tubular casing 520 and which has an auger shaft 521 mounting an auger 522. The auger shaft 502 of the elevating auger is rotatably mounted by bearings in the tubular section 500 and extends downwardly therebeneath and mounts a drive pulley 525 thereon which, through a V-belt 526, drives a driven pulley 527 on the auger shaft 521. The auger shafts 502 and 521 extend at right angles to each other and a single drive is provided by causing the drive belt 596 to turn 90° by means of idler pulleys 528 and 529 which also provide takeup adjustment for tension on the belt. These idler pulleys are mounted on a bracket 530 and are adjustable in order to provide the desired tension. The elevating auger conveyor is mounted to the discharge opening of the container 21 by a mounting plate 540 which fits into a discharge opening of the container and fits behind a wall of the container and a door 541 and with suitable attaching structure holding the panel 540 in position. A brace 542 is attached to the panel 540 and the tubular portion 520 of the charging auger, as by welding, and a feed-in section to the charging auger is provided by an inclined panel 543, with a pair of sidewalls, one of which is shown at 544 to provide a feed-in section for material flowing from the container into the charging auger.

The elevation of the elevating auger conveyor can be varied with rotation being provided by a collar band 550 which connects a lateral section 551 of the elevating auger to the tubular section 520 of the charging auger. Suitable means, such as a cable and pulleys (not shown), are provided for controlling the inclination of the elevating auger conveyor relative to the container 21.

I claim:

1. A material carrier having a container, a conveyor elevator associated therewith for elevating material discharged from the container comprising, a generally U-shaped elongate trough having two sides and a base pivoted to the carrier for varying degrees of inclination and having divider means extending along the length thereof with conveyor flights movable along both sides of said divider means, reversible means for travelling said flights upwardly along either side of said divider means, and selectively positionable means at the upper end of said base to permit discharge of material through the base when open and to direct discharge of material in an opposite direction when closed.

2. A material carrier as defined in claim 1 wherein said conveyor elevator can be disposed vertically to abut a side of the container, and a V-shaped spreader attachment carried at the upper end of said trough and spaced therefrom in the path of material discharged from the conveyor elevator when the selectively positionable means are closed to deflect conveyed material over the entire area of the container.

3. A material carrier as defined in claim 1 wherein said selectively positionable means comprises a pair of doors with a first door overlapping the second and each pivoted to said base, and means for locking said doors and for opening thereof including a handle connected to said first door and an overcenter spring operatively connected between the trough and said handle to lie at either side of the first door pivot dependent on the position of the handle and the first door.

4. A material carrier as defined in claim 1 wherein said divider means comprises a pair of partition plates extending lengthwise of said trough with a space therebetween and with curved connecting ends, sprocket shafts for said conveyor flights disposed within said space adjacent the curved ends with cutouts at said ends for sprockets connected to said shafts whereby either one of said plates function with said flights to elevate material.

5. A material carrier as defined in claim 4 including a V-shaped baffle across said space above the lower sprocket shaft to collect material falling in said space, and a pair of openings in the sides of said trough through which said falling material can discharge as collected and directed by said baffle.